United States Patent
Oyama et al.

(10) Patent No.: US 9,676,414 B2
(45) Date of Patent: Jun. 13, 2017

(54) PARKING ASSISTANCE DEVICE

(71) Applicants: Keisuke Oyama, Toyota (JP); Hironobu Ishijima, Miyoshi (JP); Hidehiko Miyoshi, Kariya (JP); Keisuke Hata, Toyota (JP)

(72) Inventors: Keisuke Oyama, Toyota (JP); Hironobu Ishijima, Miyoshi (JP); Hidehiko Miyoshi, Kariya (JP); Keisuke Hata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/893,671

(22) PCT Filed: May 29, 2013

(86) PCT No.: PCT/JP2013/064942
§ 371 (c)(1),
(2) Date: Nov. 24, 2015

(87) PCT Pub. No.: WO2014/192107
PCT Pub. Date: Dec. 4, 2014

(65) Prior Publication Data
US 2016/0107690 A1  Apr. 21, 2016

(51) Int. Cl.
*A01B 69/00* (2006.01)
*B62D 15/02* (2006.01)
*B62D 5/04* (2006.01)

(52) U.S. Cl.
CPC ......... *B62D 15/0285* (2013.01); *B62D 5/046* (2013.01)

(58) Field of Classification Search
USPC .......................................................... 701/41
See application file for complete search history.

(56) References Cited

U.S. PATENT DOCUMENTS

2004/0267420 A1\* 12/2004 Tanaka ............... B62D 15/0285
701/36
2005/0060073 A1\* 3/2005 Tanaka ............... B62D 15/0285
701/36

(Continued)

FOREIGN PATENT DOCUMENTS

CN  102883938 A  1/2013
EP  2 921 375 A1  9/2015

(Continued)

OTHER PUBLICATIONS

Office Action issued in U.S. Appl. No. 14/392,177 on Dec. 1, 2016.

(Continued)

*Primary Examiner* — Hussein A. Elchanti
(74) *Attorney, Agent, or Firm* — Finnegan, Henderson, Farabow, Garrett & Dunner, LLP

(57) ABSTRACT

A parking assistance device assists the operation of steerable wheels for the entry of a vehicle into a parking space by the automatic control of a steering device. Upon execution of the automatic control, an entry path for moving the vehicle to the parking position is calculated, and also, a target steered angle for moving the vehicle along the entry path is calculated, and the actual steered angle is detected. If the target steered angle is an angle closer to the neutral angle than the actual steered angle, then the operation of the steering wheel through the automatic control is stopped. If the target steered angle is not at an angle closer to the neutral angle than the actual steered angle, then the operation of the steering wheel through the automatic control is executed.

5 Claims, 8 Drawing Sheets

(56) References Cited

U.S. PATENT DOCUMENTS

| | | | | |
|---|---|---|---|---|
| 2005/0270177 | A1* | 12/2005 | Mori | B60T 7/12 340/932.2 |
| 2007/0027598 | A1* | 2/2007 | Mori | B60W 10/06 701/41 |
| 2007/0282504 | A1* | 12/2007 | Luke | B62D 15/0285 701/44 |
| 2009/0259365 | A1* | 10/2009 | Rohlfs | B62D 15/028 701/41 |
| 2010/0070138 | A1* | 3/2010 | Schoening | B60Q 9/004 701/42 |
| 2010/0259420 | A1* | 10/2010 | Von Reyher | B62D 15/028 340/932.2 |
| 2010/0286872 | A1* | 11/2010 | Endo | B62D 7/159 701/41 |
| 2011/0120797 | A1* | 5/2011 | Kitahata | B62D 5/04 180/443 |
| 2011/0273310 | A1 | 11/2011 | Kadowaki et al. | |
| 2011/0304477 | A1* | 12/2011 | Yoshihashi | B60W 50/14 340/932.2 |
| 2012/0133767 | A1* | 5/2012 | Muramatsu | B60R 1/00 348/148 |
| 2013/0043989 | A1 | 2/2013 | Niemz | |
| 2014/0129091 | A1 | 5/2014 | Yamazaki et al. | |
| 2016/0101813 | A1 | 4/2016 | Ishijima et al. | |
| 2016/0185389 | A1 | 6/2016 | Ishijima et al. | |

FOREIGN PATENT DOCUMENTS

| | | |
|---|---|---|
| JP | 2003-175854 | 6/2003 |
| JP | 2003-312413 A | 11/2003 |
| JP | 2004-249913 | 9/2004 |
| JP | 2009-190531 A | 8/2009 |
| JP | 2010-195224 | 9/2010 |
| JP | 2010-228591 A | 10/2010 |
| JP | 2012-066709 A | 4/2012 |
| JP | 103930334 A | 7/2014 |
| WO | WO 2014/196040 A1 | 11/2014 |

OTHER PUBLICATIONS

Notice of Allowance issued in U.S. Appl. No. 14/392,177 on Mar. 21, 2017.

* cited by examiner

PARKING ASSISTANCE DEVICE

CROSS-REFERENCE TO RELATED APPLICATIONS

This application is a national phase application of International Application No. PCT/JP2013/064942, filed May 29, 2013, the content of which is incorporated herein by reference.

TECHNICAL FIELD

The present invention relates to a parking assistance device.

BACKGROUND ART

Some vehicles such as automobiles are equipped with a parking assistance device that assists parking or exit at the time of parking into a predetermined parking space or exit from the parking space. In such a parking assistance device, the steerable wheels of the vehicle are operated to cause the vehicle to enter or exit the parking space by automatic control of a steering device, not by a driver's steering operation (see Patent Document 1). In the parking assistance device described in Patent Document 1, when a moving path along which the vehicle moves is determined at the time of entry or exit of the vehicle into or from the parking space, the operation of the steerable wheels under the automatic control of the steering device is started on condition that the steering wheel is not gripped by the driver.

PRIOR ART DOCUMENTS

Patent Documents

Patent Document 1: Japanese Laid-Open Patent Publication No. 2010-195224

SUMMARY OF THE INVENTION

Problems that the Invention is to Solve

In the parking assistance device, in assisting entry or exit of a vehicle into or from a parking space, the steerable wheels are operated by the automatic control of the steering device, not by a driver's steering operation, thus the load on the steering device increases in performing the automatic control, and the temperature of the steering device is likely to rise. This may cause a problem due to overheating of the steering device such as a decrease in durability of the steering device, which is undesirable.

An objective of the present disclosure is to provide a parking assistance device that can suppress a rise in temperature of a steering device in performing automatic control of the steering device.

Means for Solving the Problems

To achieve the foregoing objective and in accordance with one aspect of the present invention, a parking assistance device is provided that assists an operation of steerable wheels for causing a vehicle to enter or exit a parking space by automatic control of a steering device. The parking assistance device includes a path calculating section configured to calculate a moving path along which the vehicle moves to a target position, a steered angle calculating section configured to calculate a target steered angle of the steerable wheels required for causing the vehicle to move along the moving path, a steered angle detecting section configured to detect an actual steered angle of the steerable wheels, and a control section configured to stop the operation of the steerable wheels under the automatic control when the target steered angle is an angle closer to a neutral angle than the actual steered angle and to perform the operation of the steerable wheels under the automatic control when the target steered angle is not an angle closer to the neutral angle than the actual steered angle.

When the steered angle is changed to an angle other than the neutral angle (an angle at which the vehicle travels straight), a force (steering reaction force) acting in a direction in which the steered angle is returned to the neutral angle is generated in the vehicle. Accordingly, when the target steered angle is an angle closer to the neutral angle than the actual steered angle, that is, when the actual steered angle is changed toward the neutral angle, the steered angle is changed by the steering reaction force without operating the steering device. In contrast, when the target steered angle is not an single closer to the neutral angle than the actual steered angle, that is, when the actual steered angle is located between the target steered angle and the neutral angle and thus the actual steered angle is changed to be separated from the neutral angle, the steered angle can be changed by operating the steering device against the steering reaction force.

In the above described parking assistance device, when the actual steered angle is changed toward the neutral angle in assisting the operation of the steerable wheels under the automatic control of the steering device, the operation of the steerable wheels under the automatic control is stopped and the steered angle is changed using the steering reaction force at this time. In contrast, when the actual steered angle is changed to be separated from the neutral angle, the operation of the steerable wheels under the automatic control of the steering device is performed. At this time, since the steering reaction force cannot be used to change the steered angle, the steered angle is changed through the operation of the steerable wheels under the automatic control of the steering device. According to the parking assistance device, when the steering reaction force can be used to change the steered angle, the operation of the steerable wheels under the automatic control of the steering device can be stopped. Accordingly, in performing the automatic control using the steering device, it is possible to reduce the load on the steering device and thus to suppress a rise in temperature of the system, in comparison with a system in which the operation of the steerable wheels under the automatic control is performed in the entire period in which the automatic control is performed.

In the above described parking assistance device, the control section is preferably configured to permit stopping of the operation of the steerable wheels under the automatic control when a displacement of a moving position of the vehicle from the moving path is equal to or less than a predetermined value and to prohibit stopping of the operation of the steerable wheels under the automatic control when the displacement is greater than the predetermined value.

According to the above parking assistance device, when the actual steered angle is changed toward the neutral angle in assisting the operation of the steerable wheels under the automatic control of the steering device, the operation of the steerable wheels under the automatic control can be stopped to change the steered angle using the steering reaction force while the vehicle is moving along the moving path. Moreover, when the moving position of the vehicle is displaced from the moving path by only changing the steered angle using the steering reaction force, the displacement of the moving position of the vehicle can be solved by performing the operation of the steerable wheels under the automatic control of the steering device. Accordingly, it is possible to suppress displacement of the moving position of the vehicle from the moving path while suppressing a rise in temperature of the steering device using the steering reaction force and thus to appropriately cause the vehicle to enter or exit the parking space.

In the above described parking assistance device, the control section is preferably configured to permit stopping of the operation of the steerable wheels under the automatic control when a temperature of the steering device is equal to or higher than a threshold temperature and to prohibit stopping of the operation of the steerable wheels under the automatic control when the temperature of the steering device is lower than the threshold temperature.

According to the above described parking assistance device, in assisting the operation of the steerable wheels under the automatic control, when the actual steered angle is changed toward the neutral angle and the temperature of the steering device is high, the operation of the steerable wheels under the automatic control is stopped to operate the steerable wheels using the steering reaction force. Accordingly, it is possible to satisfactorily suppress a rise in temperature of the steering device. When the temperature of the steering device is low and the rise in temperature does not cause a problem, it is possible to cause the vehicle to move along a short path and to rapidly move to the target position, by performing the operation of the steerable wheels under the automatic control of the steering device to rapidly change the actual steered single.

In the above described parking assistance device, the control section is preferably configured to stop the operation of the steerable wheels under the automatic control until the actual steered angle reaches the neutral angle when the target steered angle varies to pass the neutral angle.

When the vehicle enters or exits the parking space, a steering direction reversing action is open performed to operate the steerable wheels from a state in which the steerable wheels are operated to one side of the neutral angle to a state in which the steerable wheels are operated to the other side. In this steering direction reversing action, a steering reaction force acts on the steerable wheels in the period until the actual steered angle reaches the neutral angle. Accordingly, the steered angle can be changed even when the operation of the steerable wheels under the automatic control is stopped.

According to the above described parking assistance device, since the operation of the steerable wheels under the automatic control of the steering device can be stopped in the period until the actual steered angle reaches the neutral angle in the steering direction reversing action, it is possible to suitably suppress a rise in temperature of the steering device.

MODES FOR CARRYING OUT THE INVENTION

First Embodiment

A parking assistance device according to a first embodiment will now be described.

Figure 1:
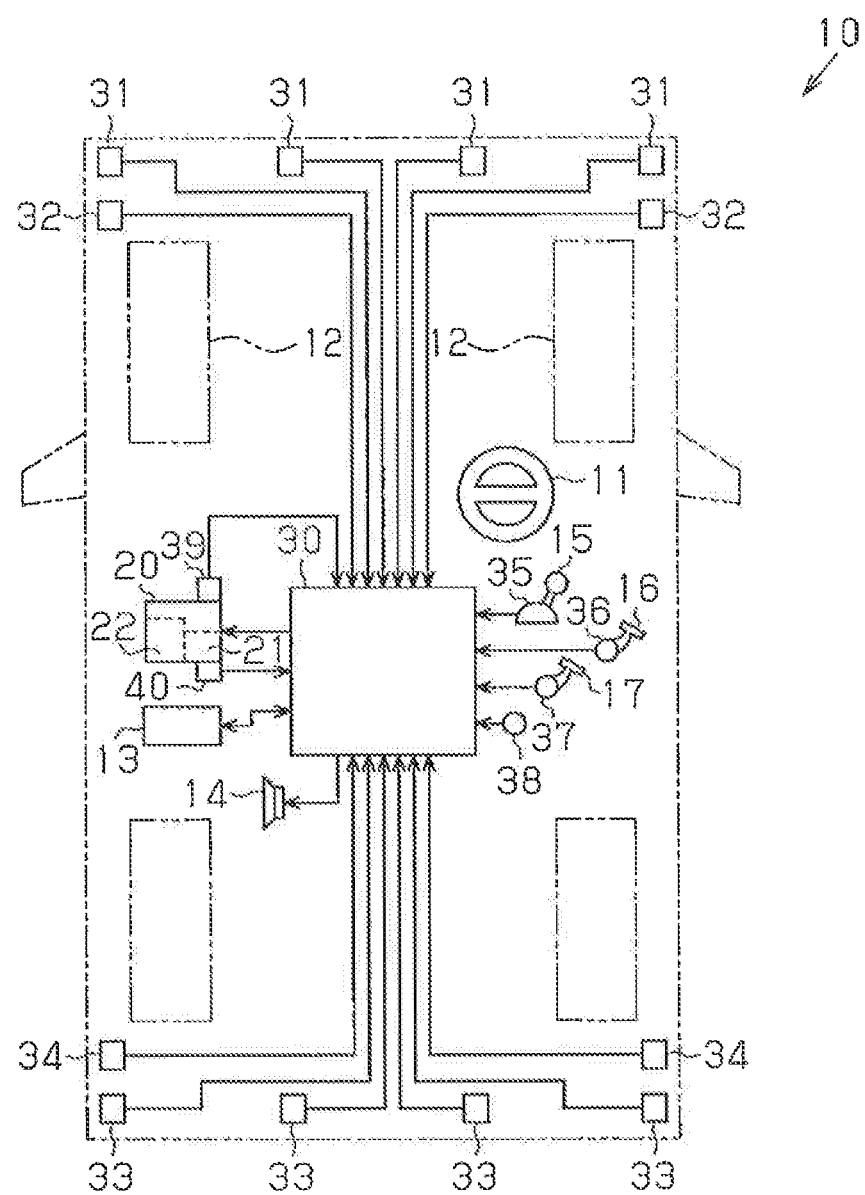
FIG. 1 is a diagram schematically illustrating the entire configuration of a vehicle to which a parking assistance device according to a first embodiment is applied.

As illustrated in FIG. 1, a vehicle 10 is provided with a steering device 20 that adjusts the traveling direction. The steering device 20 includes a motor 21, which is coupled to a steering wheel 11 and steerable wheels 12 of the vehicle 10, and a drive circuit 22, which drives the motor 21. The steering device 20 serves to operate the steerable wheels 12 of the vehicle 10 by allowing the driver to operate the steering wheel 11 and has a function of assisting the driver's operation of the steering wheel 11 using a driving force of the motor 21. The steering device 20 can operate the steerable wheels 12 with only the drive force of the motor 21 even when the driver does not operate the steering wheel 11. A display panel 11, which displays information relevant to driving and receiving various operation inputs from the driver, and a speaker 14, which notifies the driver of information and warning relevant to the driving by sound, are provided in front of the driver's seat of the vehicle 10.

Clearance sonars 31 for detecting objects present in the vicinity thereof are attached to the front end (the upper end in the drawing) of the vehicle 10 and ultrasonic sensors 32 for detecting objects present on sides in the width direction of the vehicle 10 are attached to side surfaces in the width direction (lateral direction in the drawing) in the front part of the vehicle 10. Clearance sonars 33 for detecting objects present in the vicinity thereof are attached to the rear end (the lower end in the drawing) of the vehicle 10 and ultrasonic sensors 34 for detecting objects present on sides in the width direction of the vehicle 10 are attached to side surfaces in the width direction in the rear part of the vehicle 10.

The clearance sonars 31 and 33 and the ultrasonic sensors 32 and 34 are connected to an electronic control unit 30, which performs a variety of control of the vehicle 10. The electronic control unit 30 is also connected to a shift position sensor 35, which detects an operational position of a shift lever 15 operated by the driver, an accelerator position sensor 36, which detects the degree of stepping on an accelerator pedal 16 stepped by the driver, and a brake switch 37, which detects a driver's operation of stepping on a brake pedal 17. In addition, the electronic control unit 30 is also connected to a vehicle wheel speed sensor 38, which detects a rotational speed of vehicle wheels (such as the steerable wheels 12) in the vehicle 10, an angle sensor 39 as a steered angle detecting section, which detects an operated angle (the actual steered angle Rag) of the steerable wheels 12, and a temperature sensor 40, which detects the temperature of the motor 21.

The electronic control unit 30 controls the operations of the display panel 13, the speaker 14, and the steering device 20 and receives an input of a signal output from the display panel 13 in response to the driver's operation of the display panel 13. The electronic control unit 30 assists entry of the vehicle 10 into a predetermined parking space in parking the vehicle 10 in the parking space. That is, the electronic control unit 30 operates the steerable wheels 12 to cause the vehicle 10 to enter the parking space by automatic control of the steering device 20 (specifically, the motor 21), not by the driver's steering operation and thus assists entry of the vehicle 10 into the parking space. In the present embodiment, the electronic control unit 30 functions as a path calculating section, a steered angle calculating section, and a control section.

This assistance by the automatic control of the steering device 20 is started when a request for assisting entry of the vehicle 10 into the parking space is input by the driver's operating the display panel 13 or the like. Operation modes of this entry assistance are classified into a perpendicular parking mode and a parallel parking mode. In the perpendicular parking mode, parking in which the parking space of the vehicle is located between other vehicles in the width direction of the vehicle (perpendicular parking) is assisted. In the parallel parking mode, parking in which the parking space of the vehicle is located between other vehicles in the longitudinal direction of the vehicle (parallel parking) is assisted. These operation modes are set by the driver's setting on the display panel 13 or the like.

Summary of the entry assistance in the perpendicular parking mode and the parallel parking mode will be individually described below.

The entry assistance in the perpendicular parking mode will first be described.

When the perpendicular parking mode is set and the entry assistance is started, the electronic control unit 30 instructs the driver to perform a measurement starting operation as preparation for measuring the size of the parking space through display on the display panel 13 or sound from the speaker 14.

Figure 2:
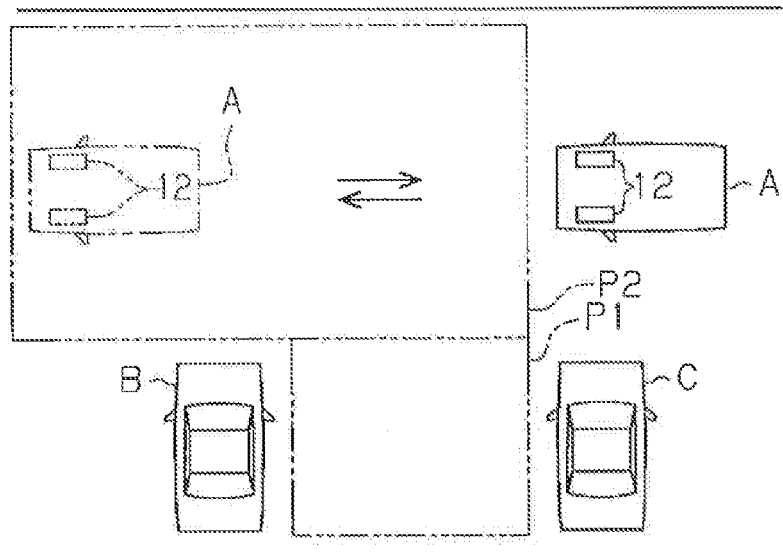
FIG. 2 is a diagram schematically illustrating movement of a vehicle when a parking space is measured in performing entry assistance in a perpendicular parking mode.

Specifically, as illustrated in FIG. 2, the electronic control unit 30 instructs the driver to stop the vehicle A facing forward at the position indicated by solid lines in the drawing, that is, at a position on the side of a parking space P1, which is located between other vehicles B and C immediately before the vehicle A enters a part corresponding to the parking space P1 through forward traveling of the vehicle A to the parking space P1. In the state in which the vehicle A is stopped at the position, the electronic control unit 30 instructs the driver to release the brake pedal 17 in a state in which the shift lever 15 (FIG. 1) is in the drive position. The electronic control unit 30 performs a measuring process for measuring the size of the parking space P1 (FIG. 2) using the clearance sonars 31 and 33 and the ultrasonic sensors 32 and 34 on condition that the driver has performed the above-mentioned measurement starting process.

In the measuring process, the vehicle A moves forward and backward between the position indicated by the solid lines and a position indicated by the long dashed double-short dashed lines, that is, a position immediately after the vehicle A has passed through one side of the parking space P1 by forward movement. The electronic control unit 30 monitors signals from the clearance sonars 31 and 33 and the ultrasonic sensors 32 and 34 at the time of forward and backward movement and obtains the size of the parking space P1 and the relative position of the vehicle A to the parking space P1 based on the signals from the sensors. Thereafter, the electronic control unit 30 calculates a path for entry (entry path) of the vehicle A into the parking space P1 from the position indicated by the solid lines based on a margin of the size of the parking space P1 with respect to the size of the vehicle A. In calculating the entry path, it is preferable that the size of a peripheral space P2 used for entry of the vehicle A into the parking space P1 be considered in addition to the margin of the size of the parking space P1 with respect to the size of the vehicle A as described above. The size of the peripheral space P2 can be obtained based on the signals from the clearance sonars 31 and 33 and the ultrasonic sensors 32 and 34 at the same time as obtaining the size of the parking space P1 through the measuring process.

The electronic control unit 30 instructs the driver to operate the shift lever 15, the accelerator pedal 16, and the brake pedal 17 such that the vehicle A moves along the entry path, which is the calculated moving path, and performs the automatic control of the steering device 20 (specifically, the motor 21 and the drive circuit 22 thereof) in response to the driver's operation based on the instruction. In this automatic control, the steerable wheels 12 are operated to realize movement of the vehicle A along the entry path only by driving the motor 21 of the steering device 20, not by the driver's steering operation. The operation of the steerable wheels 12 is performed as follows. That is, first, the moving position of the vehicle 10 is calculated based on the initial position (the relative position of the vehicle 10 at the time of starting the entry assistance) of the vehicle 10, the vehicle wheel speed SPD, and the actual steered angle Rag, and a target steered angle Tag required for causing the vehicle 10 to move along the entry path is calculated based on the moving position and the entry path. Then, the operation of the steering device 20 is controlled such that the target steered angle Tag agrees with the actual steered angle Rag.

Figure 3:
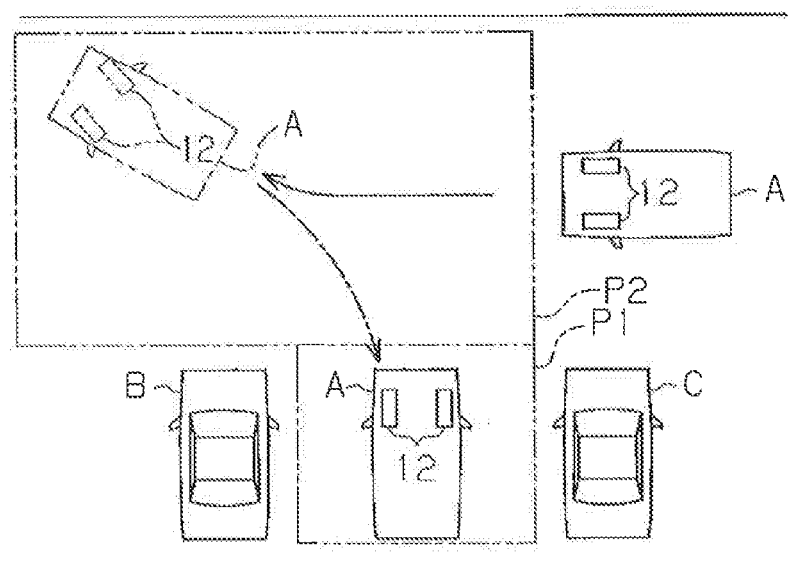
FIG. 3 is a schematic diagram illustrating an example of an operation of steerable wheels in performing the entry assistance in the perpendicular parking mode.

FIG. 3 illustrates an example of the operation of the steerable wheels 12 based on the automatic control of the steering device 20 in performing the entry assistance in the perpendicular parking mode. In the entry assistance in the perpendicular parking mode, first, as indicated by the solid arrow in FIG. 3, the vehicle A moves forward to pass the front side of the parking space P1 and then stops at a position at which the rear part of the vehicle A faces the parking space P1 (the position indicated by the long dashed double-short dashed lines in FIG. 3). At this time, the steerable wheels 12 are operated by the motor 21 of the steering device 20 such that the direction of the steerable wheels 12 is changed to a direction in which the vehicle A is separated from the parking space P1 (the rightward direction in the example illustrated in FIG. 3). Thereafter, as indicated by the long dashed short dashed arrow in FIG. 3, the vehicle A moves backward while changing the direction of the steerable wheels 12 and the vehicle A moves to a parking position, which is a target position in the parking space P1. At this time, the steerable wheels 12 are operated through the driving of the motor 21 or the steering device 20 such that the direction of the steerable wheels 12 is changed to the opposite direction (the leftward direction in the example illustrated in FIG. 3) of the direction in forward movement and then gets gradually close to the neutral angle (the angle at which the vehicle 10 moves straight forward). When the vehicle A stops at the parking position, the parking of the vehicle A into the parking space P1 is completed.

The entry assistance in the parallel parking mode will be described below.

When the parallel, parking mode is set and the entry assistance is started, the electronic control unit 30 instructs the driver to perform, a measurement starting operation as preparation for measuring the size of a parking space through display on the display panel 13 or sound from the speaker 14. Specifically, the electronic control unit 30 instructs the driver to stop a vehicle A facing forward at a position indicated by solid lines in FIG. 4, that is, at a position on the side of a parking space P1 between other vehicles B and C immediately before the vehicle A enters a part corresponding to the parking space P1 through forward traveling of the vehicle A to the parking space P1. In the state in which the vehicle A is stopped at the position, the electronic control unit 30 instructs the driver to release the brake pedal 17 in a state in which the shift lever 15 (FIG. 1) is in the drive position. The electronic control unit 30 performs a measuring process for measuring the sire of the parking space P1 (FIG. 4) using the clearance sonars 31 and 33 and the ultrasonic sensors 32 and 34 on condition that the driver has performed the above-mentioned measurement starting process.

Figure 4:
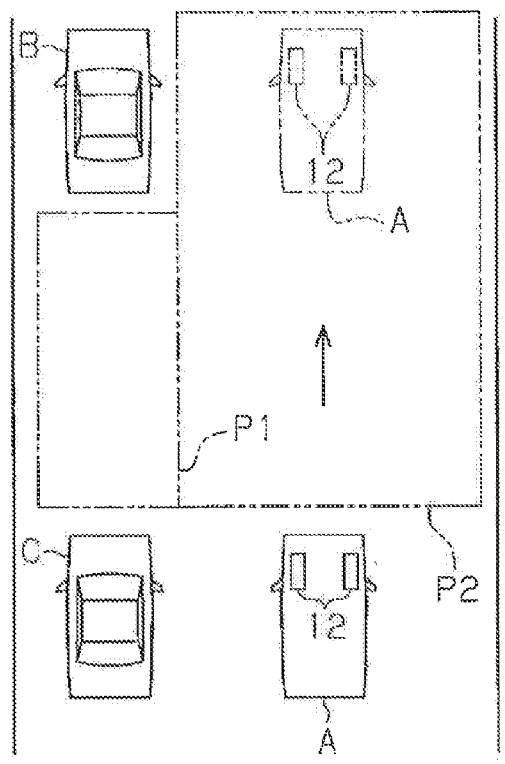
FIG. 4 is a diagram schematically illustrating movement of a vehicle when a parking space is measured in performing the entry assistance in a parallel parking mode.

In the measuring process, the vehicle A moves from the position indicated by the solid lines in FIG. 4 to the position indicated by the long dashed double-short dashed lines, that is, to a position immediately after the vehicle A has passed through one side of the parking space P1 by forward movement and stops at that position. The electronic control unit 30 monitors signals from the clearance sonars 31 and 33 and the ultrasonic sensors 32 and 34 indicated in FIG. 1 while the vehicle A moves from the position indicated by the solid lines to the position indicated by the long dashed double-short dashed lines, and obtains the size of the parking space P1 and the relative position of the vehicle A to the parking space P1 based on the signals from the sensors.

Thereafter, the electronic control unit 30 calculates a path for entry (entry path) of the vehicle A into the parking space P1 from the position indicated by the long dashed double-short dashed lines in FIG. 4 based on the margin of the size of the parking space P1 with respect to the size of the vehicle A. In calculating the entry path, it is preferable that the size of a peripheral space P2 used for entry of the vehicle A into the parking space P1 be considered in addition to the margin of the size of the parking space P1 with respect to the size of the vehicle A as described above. The size of the peripheral space P2 can be obtained based on the signals from the clearance sonars 31 and 33 and the ultrasonic sensors 32 and 34 at the same time as obtaining the size of the parking space P1 through the measuring process.

The electronic control unit 30 instructs the driver to operate the shift lever 15, the accelerator pedal 16, and the brake pedal 17 such that the vehicle A moves along the entry path, which has been calculated as described above, and performs the automatic control of the steering device 20 in response to the driver's operation based on the instruction. In this automatic control, the steerable wheels 12 are operated to realize movement of the vehicle A along the entry path only by driving the motor 21 of the steering device 20, not by the driver's steering operation. In this way, the entry of the vehicle A into the parking space P1 is assisted.

Figure 5:
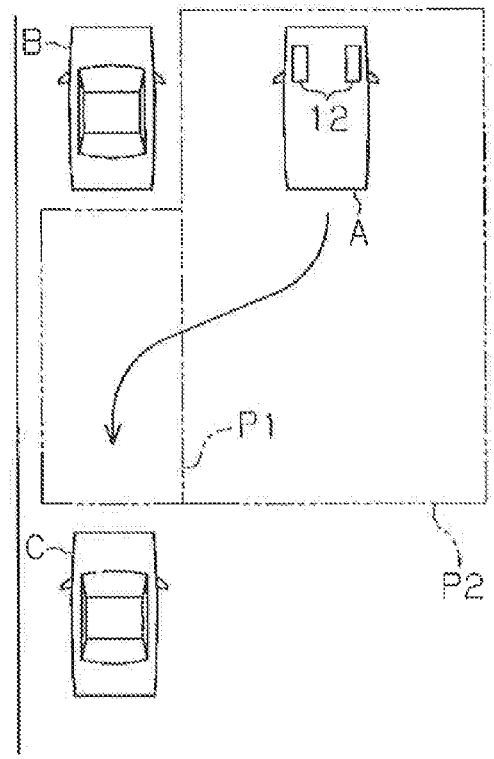
FIG. 5 is a schematic diagram illustrating an example of an operation of steerable wheels in performing the entry assistance in the parallel parking mode.

FIG. 5 illustrates an example of the operation of the steerable wheels 12 based on the automatic control of the steering device 20 in performing the entry assistance in the parallel parking mode. In the entry assistance in the parallel parking mode, the steerable wheels 12 are operated by the motor 21 of the steering device 20 such that the vehicle A enters the parking space P1 by moving backward as indicated by the arrow in FIG. 5. Specifically, first, the direction of the steerable wheels 12 is changed to one direction (the leftward direction in the example illustrated in FIG. 5) such that the rear part of the vehicle A faces the parking space P1 at the time of backward movement. Thereafter, the direction of the steerable wheels 12 is changed to the opposite direction (the rightward direction in the example illustrated in FIG. 5) by a steering direction reversing action. Thereafter, the direction of the steerable wheels 12 is changed to gradually get close to the neutral angle. In this way, when the steerable wheels 12 are operated through the driving of the motor 21 of the steering device 20 and the vehicle A stops at the parking position, the parking of the vehicle A into the parking space P1 is completed.

In the system according to the present embodiment, the entry of the vehicle A into the parking space P1 is assisted in this way, both in the perpendicular parking mode and the parallel parking mode. In assisting the entry of the vehicle A into the parking space P1, adjustment of the driving force of the vehicle A, driving of the brake pedal, and changing of the shift position for causing the vehicle A to move along the entry path may be automatically performed in addition to automatic control of the steering device 20 as described above.

In the parking assistance device, in assisting the entry of the vehicle 10 into the parking space P1, the steerable wheels 12 are operated by the automatic control of the steering device 20, not by a driver's operating the steering wheel 11. Accordingly, the load on the steering device 20 (specifically, the motor 21 and the drive circuit 22) increases in performing the automatic control and the temperature of the steering device 20 is likely to rise. This may cause a problem due to overheating of the steering device 20 such as a decrease in durability of the steering device 20, which is undesirable.

Accordingly, in the present embodiment, in performing the automatic control of the steering device 20, the operation of the steerable wheels 12 under the automatic control is stopped when a target control value of the steered angle (the target steered angle Tag) is an angle closer to the neutral angle than the actual steered angle (the actual, steered angle Rag) detected by the angle sensor 39. Specifically, when the target steered angle Tag is changed to pass the neutral angle, the target steered angle Tag is an angle closer to the neutral angle than the actual steered angle Rag until the actual steered angle Rag reaches the neutral angle, and thus the operation of the steerable wheels 12 under the automatic control is stopped. On the other hand, in performing the automatic control of the steering device 20, the operation of the steerable wheels 12 under the automatic control is performed when the target steered angle Tag is not an angle closer to the neutral angle than the actual steered angle Rag, that is, when the actual steered angle Rag is present between the target steered angle Tag and the neutral angle.

Operations in performing the automatic control of the steering device 20 in this way wild be described below.

A force (steering reaction force) acting in a direction in which the actual steered angle Rag is returned to the neutral angle is generated in the vehicle 10 when the actual steered angle Rag is changed to an angle other than the neutral angle. Accordingly, when the target steered angle Tag is an angle closer to the neutral angle than the actual steered angle Rag, that is, when the actual steered angle Rag is changed toward the neutral angle, the actual steered angle Rag is changed by the steering reaction force without operating the steering device 20. In contrast, when the target steered angle Tag is not an angle closer to the neutral angle than the actual steered angle Rag, that is, when the actual steered angle Rag is present between the target steered angle Tag and the neutral angle and the actual steered angle Rag is changed in a direction in which the actual steered angle is separated from the neural angle, the actual steered angle Rag can be changed by operating the steering device 20 against the steering reaction force.

Figure 6:
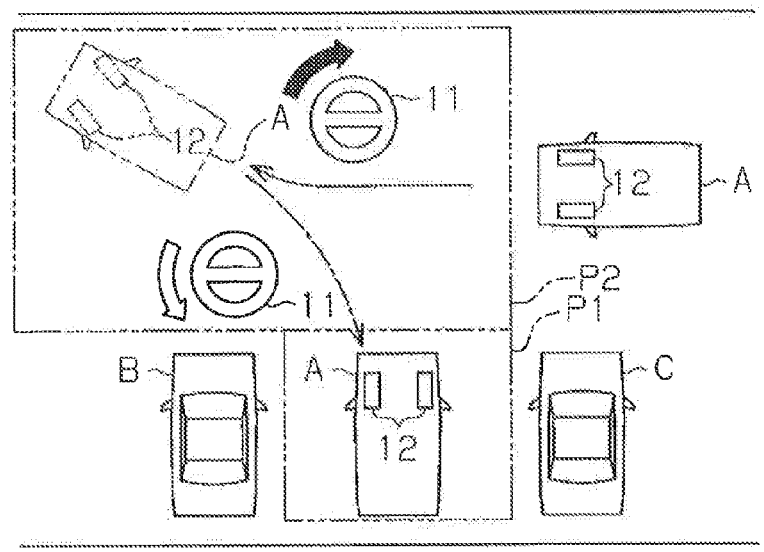
FIG. 6 is a schematic diagram illustrating an example of an operation of steerable wheels in performing the entry assistance in the perpendicular parking mode.

As illustrated in FIG. 6, in assisting the entry in the perpendicular parting node, the direction of the steerable wheels 12 is changed to one direction (the right direction in the example illustrated in FIG. 6) such that the actual steered angle Rag is separated from the neutral angle when the vehicle 10 moves forward to pass the front side of the parking space P1 and then stops. At this time, since the steering reaction force cannot be used to change the steered angle, the steerable wheels 12 are operated to change the actual steered angle Rag under the automatic control of the steering device 20 to rotate the steering wheel 11 in one direction (clockwise direction) as indicated by the black arrow in FIG. 6.

Thereafter, when the vehicle 10 moves backward while changing the direction of the steerable wheels 12 and moves to the parking position in the parking space P1, first, the direction of the steerable wheels 12 is changed from the direction in the forward movement to the opposite direction (the leftward direction in the example illustrated in FIG. 6). In the first half of a period in which the steering direction reversing action is performed (steering direction reversing period), since the direction of the steerable wheels 12 is changed such that the actual steered angle Rag gets close to the neutral angle, the steering reaction force can be used to change the steered angle. In the present embodiment, the operation of the steerable wheels 12 under the automatic control of the steering device 20 is stopped at this time and the actual steered angle Rag is changed to use the steering reaction force to rotate the steering wheel 11 in one direction (counterclockwise direction) as indicated by the blank arrow in FIG. 6. On the other hand, in the second half of the steering direction reversing period (specifically, after the actual steered angle Rag passes the neutral angle), the direction of the steerable wheels 12 is changed to separate the actual steered angle Rag from the neutral angle. At this time, since the steering reaction force cannot be used to change the steered angle, the steerable wheels 12 are operated to change the actual steered angle Rag through the automatic control of the steering device 20. After the steering direction reversing action of the vehicle 10 is completed, the actual steered angle Rag is gradually changed to the neutral angle to guide the vehicle A to the parking position.

At this time, even when the target steered angle Tag is an angle closer to the neutral angle than the actual steered angle Rag, it is necessary to cause the vehicle A to accurately stop at the parking position by finely adjusting the actual steered angle Rag and thus the operation of the steerable wheels 12 under the automatic control of the steering device 20 is performed.

Figure 7:
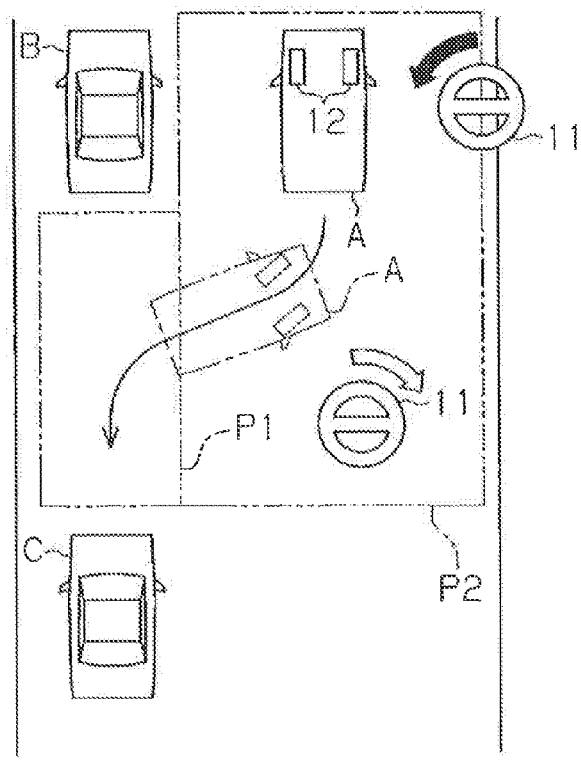
FIG. 7 is a schematic diagram illustrating an example of an operation of steerable wheels in performing the entry assistance in the parallel parking mode.

As illustrated in FIG. 7, in the initial part of the period in which the vehicle 10 enters the parking space P1 in assisting the entry in the parallel parking mode, the direction of the steerable wheels 12 is changed to one direction (the leftward direction in the example illustrated in FIG. 7) such that the actual steered angle Rag is separated from the neutral angle. At this time, since the steering reaction force cannot be used to change the steered angle, the steerable wheels 12 are operated to change the actual steered angle Rag under the automatic control of the steering device 20 to rotate the steering wheel 11 in one direction (counterclockwise direction) as indicated by the black arrow in FIG. 7.

In the middle part of the period in which the vehicle 10 enters the parking space P1 in assisting the entry in the parallel parking mode, the direction of the steerable wheels 12 is changed from the direction in the initial period to the opposite direction (the rightward direction in the example illustrated in FIG. 7). In the first half of a steering direction reversing period, in which the steering direction reversing action is performed, since the direction of the steerable wheels 12 is changed such that the actual steered angle Rag gets close to the neutral angle, the steering reaction force can be used to change the steered angle. In the present embodiment, the operation of tire steerable wheels 12 under the automatic control of the steering device 20 is stopped at this time and the actual steered angle Rag is changed to use the steering reaction force to rotate the steering wheel 11 in one direction (in the clockwise direction) as indicated by the blank arrow in FIG. 7. On the other hand, in the second half of the steering direction reversing period (specifically, after the actual steered angle Rag passes the neutral angle), the direction of the steerable wheels 12 is changed to separate the actual steered angle Rag from the neutral angle. At this time, since the steering reaction force cannot be used to change the steered angle, the steerable wheels 12 are operated to change the actual steered angle Rag through the automatic control of the steering device 20.

In the final part of the period in which the vehicle 10 enters the parking space P1 in assisting the entry in the parallel parking mode, that is, after the steering direction reversing action of the vehicle 10 is completed, the actual steered angle Rag is gradually changed to the neutral angle to guide the vehicle A to the parking position. At this time, even when the target steered angle Tag is an angle closer to the neutral angle than the actual steered angle Rag, it is necessary to cause the vehicle A to accurately stop at the parking position by finely adjusting the actual steered angle Rag and thus the operation of the steerable wheels 12 under the automatic control of the steering device 20 is performed.

Accordingly, in the system according to the present embodiment, in either one of the entry assistance in the perpendicular parking mode and the entry assistance in the parallel parking mode, the operation of the steerable wheels 12 under the automatic control of the steering device 20 is stopped and the actual steered angle Rag is changed to use the steering reaction force, when the actual steered angle Rag is changed toward the neutral angle in the steering direction reversing action. On the other hand, when the actual steered angle Rag is changed in the direction in which the actual steered angle Rag is separated from the neutral angle, the operation of the steerable wheels 12 under the automatic control of the steering device 20 is performed. At this time, since the steering reaction force cannot be used to change the steered angle, the actual steered angle Rag is changed through the operation of the steerable wheels 12 under the automatic control of the steering device 20.

Accordingly, in the system according to the present embodiment, the operation of the steerable wheels 12 under the automatic control of the steering device 20 can be stopped when the steering reaction force can be used to change the actual steered angle Rag. In the present embodiment, when the operation of the steerable wheels 12 under the automatic control of the steering device 20 is stopped, the current supplied to the motor 21 is 0. Accordingly, in this case, since the operating state of the motor 21 is a torque free state in which a rotational torque is not applied to the output shaft, the output shaft of the motor 21 rotates by application of the steering reaction force to the steering device 20 and thus the direction of the steerable wheels 12 is changed. At this time, heating due to the power consumption in the motor 21 or the drive circuit 22 is suppressed. Accordingly, in comparison with a system in which the operation of the steerable wheels 12 under the automatic control is performed in the entire period in which the automatic control of the steering device 20 is performed, it is possible to reduce the load on the steering device 20 (specifically, the motor 21 or the drive circuit 22) and thus to suppress a rise in temperature of the steering device 20.

In the system according to the present embodiment, in either one of the entry assistance in the perpendicular parking mode and the entry assistance in the parallel parking mode, the steering direction reversing action the steerable wheels 12 from a state in which the steerable wheels 12 are steered to one side of the neutral angle to a state in which the steerable wheels 12 are steered to the other side thereof is performed. In the steering direction reversing action, the steering reaction force acts on the steerable wheels 12 in the period in which the actual steered angle Rag reaches the neutral angle. Accordingly, even when the operation of the steerable wheels 12 under the automatic control of the steering device 20 is stopped at this time, it is possible to change the actual steered angle Rag. In the system according to the present embodiment, in the period in which the actual steered angle Rag reaches the neutral angle in the steering direction reversing action, the operation of the steerable wheels 12 under the automatic control of the steering device 20 is stopped and thus a rise in temperature of the steering device 20 is suppressed.

In the system according to the present embodiment, when the target steered angle Tag is an angle closer to the neutral angle than the actual steered angle Rag, that is, even when the steering reaction force can be used to change the actual steered angle Rag, the operation of the steerable wheels 12 under the automatic control of the steering device 20 is stopped only when the temperature of the steering device 20 is equal to or higher than a threshold temperature J. In the present embodiment, when the steerable wheels 12 can be operated under the automatic control of the steering device 20 in the entire period in which the entry assistance is performed, a temperature range in which the temperature of the steering device 20 may rise to cause a decrease in durability was acquired in advance based on results of various tests or simulations by the inventors. The lowest temperature of the temperature range is stored as the threshold temperature J in the electronic control unit 30.

Accordingly, in changing the actual steered angle Rag toward the neutral angle in the assistance under the automatic control of the steering device 20, when the temperature of the steering device 20 is high and there is a possibility of an excessive rise in temperature of the steering device 20, the operation of the steerable wheels 12 under the automatic control is stopped to operate the steerable wheels 12 using the steering reaction force. At this time, since the current supplied to the motor 21 is 0, heating due to the power consumption in the motor 21 or the drive circuit 22 is suppressed and the rise in temperature of the steering device 20 is satisfactorily suppressed.

On the other hand, when the temperature of the steering device 20 is low and the rise in temperature thereof does not cause any problem, the operation of the steerable wheels 12 under the automatic control of the steering device 20 is performed though the target steered angle Tag becomes an angle closer to the neutral angle than the actual steered angle Rag by the steering direction reversing action. When the direction of the steerable wheels 12 is changed using the steering reaction force, the changing rate thereof cannot be set to be higher than that in the case in which the direction of the steerable wheels is changed through the automatic control of the steering device 20. Accordingly, the path along which the vehicle 10 actually moves in the entry assistance is likely to become longer or the moving time thereof is likely to increase. In the system according to the present embodiment, when the rise in temperature of the steering device 20 does not cause any problem, the operation of the steerable wheels 12 under the automatic control of the steering device 20 is performed to rapidly change the direction of the steerable wheels 12. Accordingly, the vehicle 10 can move along a short path suitable for entry into the parking space P1 and the vehicle 10 can rapidly move to the parking position in the parking space P1.

The process (automatic control process) of automatically controlling the steering device 20 in assisting the entry of the vehicle 10 will be described below in detail with reference to the flowchart illustrated in FIG. 8.

Figure 8:
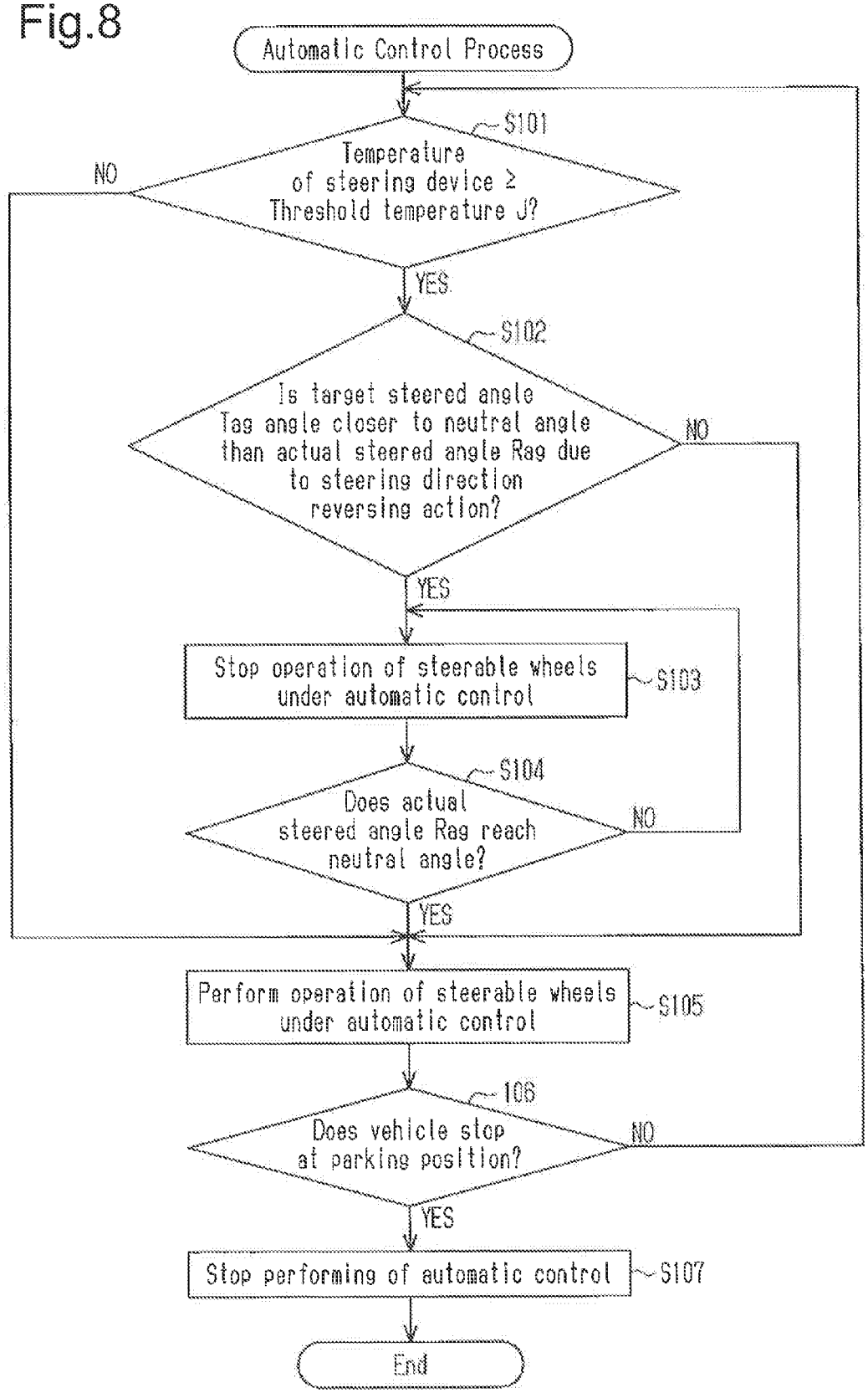
FIG. 8 is a flowchart illustrating a flow of an automatic control process according to the first embodiment.

A series of processes illustrated in the flowchart of FIG. 8 conceptually represents a flow of the automatic control process. The actual processing of the automatic control process is performed as an interrupt process every predetermined cycle by the electronic control unit 30. The automatic control process is performed on condition that calculation of the entry path has been completed in performing the entry assistance of the vehicle 10.

As illustrated in FIG. 8, in this process flow, when the temperature of the steering device 20 (specifically, the motor 21) is lower than the threshold temperature J (NO in step S101), the operation of the steerable wheels 12 under the automatic control of the steering device 20 is performed (step S105) until the vehicle 10 stops at the parking position in the parking space P1 (NO in step S106). When the vehicle 10 stops at the parking position (YES in step S106), the automatic control of the steering device 20 is stopped (step S107) and this process flow ends.

In this process flow, when the temperature of the steering device 20 is lower than the threshold temperature J, since the temperature of the steering device 20 is low and thus the rise in temperature thereof does not cause any problem, stopping of the operation of the steerable wheels 12 under the automatic control of the steering device 20 is prohibited. Accordingly, it is possible to enable the vehicle 10 to rapidly move to the parking position in the parking space P1. In order to suppress a decrease in durability of the steering device 20, the entry assistance may be stopped when the temperature of the steering device 20 is higher than a predetermined upper-limit temperature. In this system, when the rise in temperature of the steering device 20 is caused, a decrease in opportunity for performing entry assistance is caused. According to the present embodiment, since the rise in temperature of the steering device 20 in such a system is suppressed and the frequency in which the temperature is higher than the upper-limit temperature is lowered, it is possible to suppress the decrease in opportunity for performing entry assistance.

In contrast, when the temperature of the steering device 20 is equal to or higher than the threshold temperature J (YES in step S101), the automatic control is performed in which performing (step S105) and stopping (step S103) of the operation of the steerable wheels 12 under the automatic control of the steering device 20 are switched based on the relationship between the actual steered angle Rag and the target steered angle Tag.

First, when the actual steered angle Rag is an angle closer to the neutral angle than the target steered angle Tag or when the target steered angle Tag is changed to an angle closer to the neutral angle than the actual steered angle Rag by an operation other than the steering direction reversing action (NO in step S102), the operation of the steerable wheels 12 under the automatic control of the steering device 20 is performed (step S105). The operation of the steerable wheels 12 under the automatic control is performed until the moving position of the vehicle 10 reaches the parking position (NO in step S106).

When the temperature of the steering device 20 is equal to or higher than the threshold temperature J (YES in step S101) and the target steered angle Tag is an angle closer to the neutral angle than the actual steered angle Rag in the steering direction reversing action of the vehicle 10 (YES in step S102), the operation of the steerable wheels 12 under the automatic control of the steering device 20 is stopped (step S103). Accordingly, since the operating state of the motor 21 is a torque-free state, in which a rotational torque is not applied to the output shaft, the motor 21 rotates to change the direction of the steerable wheels 12 by application of the steering reaction force while the vehicle 10 is traveling. Even when the operation of the steerable wheels 12 under the automatic control is stopped, the target steered angle Tag is calculated. The changing rate of the steered angle using the steering reaction force when the operation of the steerable wheels 12 under the automatic control is stopped is lower than the changing rate of the steered angle through the operation of the steerable wheels 12 under the automatic control. Accordingly, when the operation of the steerable wheels 12 under the automatic control is stopped in the steering direction reversing action, the target steered angle Tag is an angle closer to the neutral angle than the actual steered angle Rag until the actual steered angle Rag reaches the neutral angle.

The process of step S103 is continuously performed until the actual steered angle Rag reaches the neutral angle (NO in step S104). When the actual steered angle Rag reaches the neutral angle (YES in step S104), performing of the operation of the steerable wheels 12 under the automatic control of the steering device 20 is started (step S105). In this way, in the automatic control process according to the present embodiment, in the period until the actual steered angle Rag reaches the neutral angle in the steering direction reversing action of the vehicle 10, the operation of the steerable wheels 12 under the automatic control of the steering device 20 is stopped and the rise in temperature of the steering device 20 is suppressed.

Thereafter, when the vehicle 10 stops at the parking position (YES in step S106), the automatic control of the steering device 20 is stopped (step S107) and this process flow ends.

As described above, the present embodiment achieves the following advantages.

(1) The operation of the steerable wheels 12 under the automatic control of the steering device 20 is stopped when the target steered angle Tag is an angle closer to the neutral angle than the actual steered angle Rag due to the steering direction reversing action, and is performed when the target steered angle Tag is not an angle closer to the neutral angle than the actual steered angle Rag. Accordingly, when the steering reaction force can be used to change the actual steered angle Rag, the operation of the steerable wheels 12 under the automatic control of the steering device 20 can be stopped. As a result, in comparison with a system in which the operation of the steerable wheels 12 under the automatic control is performed in the entire period in which the automatic control of too steering device 20 is performed, it is possible to reduce the load on the steering device 20 and thus to suppress the rise in temperature of the steering device 20.

(2) Stopping of the operation of the steerable wheels 12 under the automatic control of the steering device 20 is permitted when the temperature of the steering device 20 is equal to or higher than the threshold temperature J, and the stopping of the operation of the steerable wheels 12 under the automatic control is prohibited when the temperature of the steering device 20 is lower than the threshold temperature J. Accordingly, when the temperature of the steering device 20 is high, the operation of the steerable wheels 12 under the automatic control can be stopped to operate the steerable wheels 12 using the steering reaction force. As a result, it is possible to satisfactorily suppress the rise in temperature of the steering device 20. When the temperature of the steering device 20 is low and the rise in temperature thereof does not cause any problem, the operation of the steerable wheels 12 under the automatic control of the steering device 20 is performed even though the target steered angle Tag is an angle closer to the neutral angle than the actual steered angle Rag due to the steering direction reversing action. Accordingly, it is possible to cause the vehicle 10 to rapidly move to the parking position in the parking space P1.

(3) When the target steered angle Tag is changed to pass the neutral angle, the operation of the steerable wheels 12 under the automatic control of the steering device 20 is stopped until the actual steered angle Rag reaches the neutral angle. Accordingly, it is possible to suppress the rise in temperature of the steering device 20.

Second Embodiment

A parking assistance device according to a second embodiment will now be described. Differences from the first embodiment will mainly be discussed.

The present embodiment is different from the first embodiment in conditions for performing the process for stopping the operation of the steerable wheels 12 under the automatic control of the steering device 20 when the target steered angle Tag is an angle closer to the neutral angle than the actual steered angle Rag due to the steering direction reversing action. Specifically, stopping of the operation of the steerable wheels 12 under the automatic control is permitted when the temperature of the motor 21 is equal to or higher than the threshold temperature J in the system according to the first embodiment, while it is permitted when a displacement of the moving position of the vehicle 10 from the entry path is equal to or less than a predetermined value in the system according to the present embodiment.

Operations in performing the automatic control of the steering device 20 in this way will be described below.

In the present embodiment, in changing the actual steered angle Rag toward the neutral angle under the automatic control in the entry assistance of the vehicle 10, the operation of the steerable wheels 12 under the automatic control is stopped when the displacement of the moving position of the vehicle 10 from the entry path is small, that is, when the vehicle 10 moves along the moving path. Accordingly, the actual steered angle Rag can be changed using the steering reaction force at this time. Moreover, when the moving position of the vehicle 10 is displaced from the entry path as the result of changing of the actual steered angle Rag using the steering reaction force, it is possible to rapidly change the direction of the steerable wheels 12 by performing the operation of the steerable wheels 12 under the automatic control of the steering device 20 and thus to solve the displacement of the moving position of the vehicle 10 from the entry path.

Figure 9:
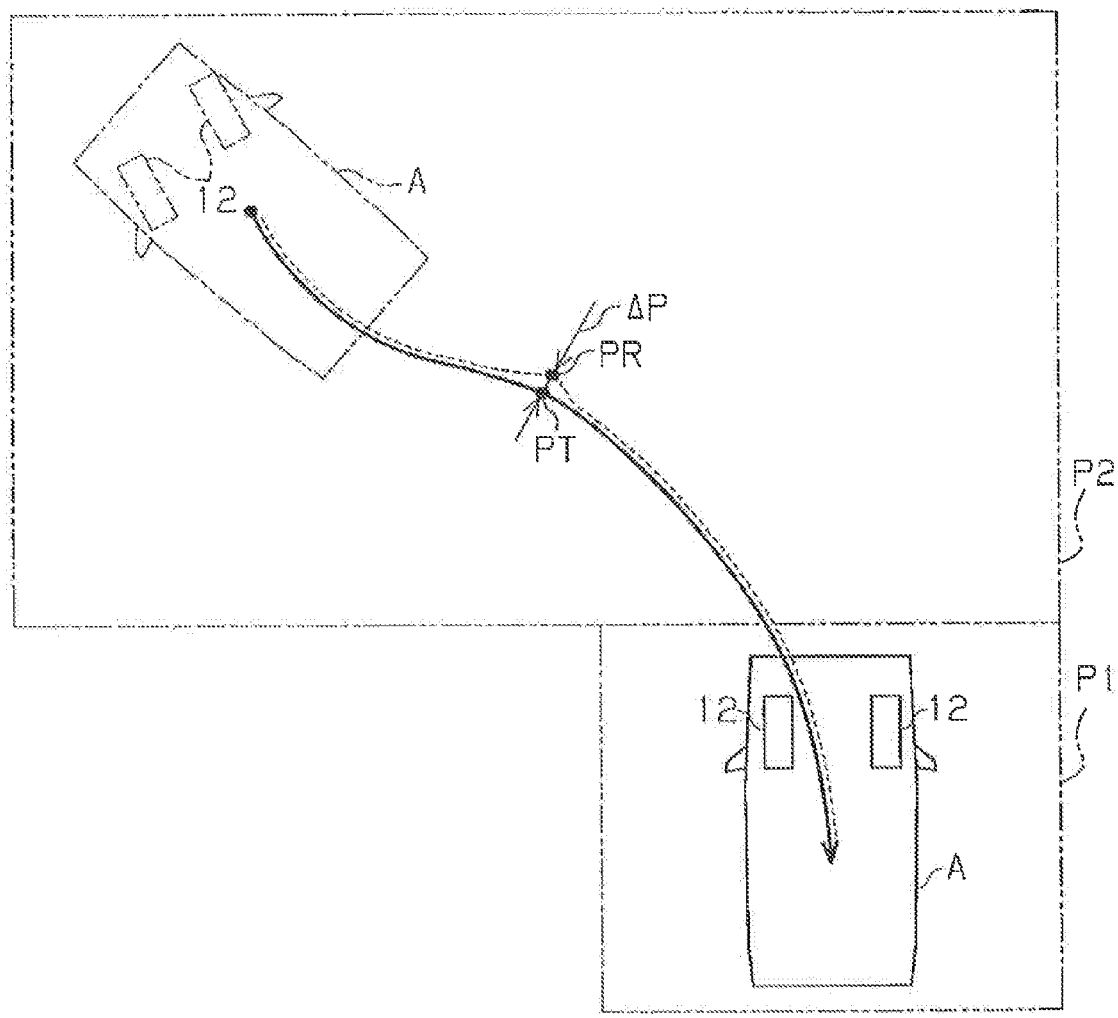
FIG. 9 is a schematic diagram illustrating an example of a relationship between an entry path and a moving position of a vehicle in performing an automatic control process in a parking assistance device according to a second embodiment.

FIG. 9 illustrates an example of the relationship between the entry path and the moving position of the vehicle 10 when the displacement of the moving position of the vehicle 10 from the entry path increases. In FIG. 9, the solid arrow indicates the entry path and the dotted line indicates change of the moving position of the vehicle 10.

As illustrated in FIG. 9, in a period in which the operation of the steerable wheels 12 under the automatic control of the steering device 20 is not being performed, when the moving position of the vehicle 10 is displaced from the entry path and the displacement $\Delta P$ (the distance between an ideal moving position PT and an actual moving position PR of the vehicle 10) is greater than a predetermined value, the operation of the steerable wheels 12 under the automatic control is started.

The displacement $\Delta P$ can be calculated, for example, as follows. That is, first, the moved distance of the vehicle 10 from the initial position (the position of the vehicle 10 at the time of starting the entry assistance) is calculated based on the detection signal from the vehicle wheel speed sensor 38 and the position when the vehicle is assumed to move along the entry path by the calculated moved distance is calculated as an ideal moving position PT of the vehicle 10. Then, the actual moving position PR of the vehicle 10 is calculated based on the initial position, the actual steered angle Rag, and the vehicle wheel speed SPD. The distance between the ideal moving position PT and the actual moving position PR is calculated as the displacement $\Delta P$. In the present embodiment, the relationship between the displacement $\Delta P$ and the entry pattern of the vehicle 10 into the parking space P1 was calculated based on results of various tests or simulations by the inventors, and the displacement $\Delta P$ at which the function of causing the vehicle 10 to appropriately enter the parking space P1 can be ensured is calculated based on the relationship. The maximum value of the displacement $\Delta P$ calculated in this way is stored as the predetermined value in the electronic control unit 30.

In the system according to the present embodiment, when the displacement $\Delta P$ is greater than the predetermined value, that is, when there is a possibility that the vehicle 10 cannot appropriately enter the parking space P1, the operation of the steerable wheels 12 under the automatic control of the steering device 20 is performed to rapidly change the direction of the steerable wheels 12. Accordingly, the displacement $\Delta P$ decreases such that the vehicle 10 can appropriately enter the parking space P1. As a result, according to the present embodiment, it is possible to suppress the rise in temperature of the steering device 20 using the steering reaction force as described above and also to cause the vehicle 10 to appropriately enter the parking space P1 by suppressing the displacement of the moving position of the vehicle 10 from the existing entry path.

The automatic control process according to the present embodiment will be described below in detail with reference to the flowchart illustrated in FIG. 10.

Figure 10:
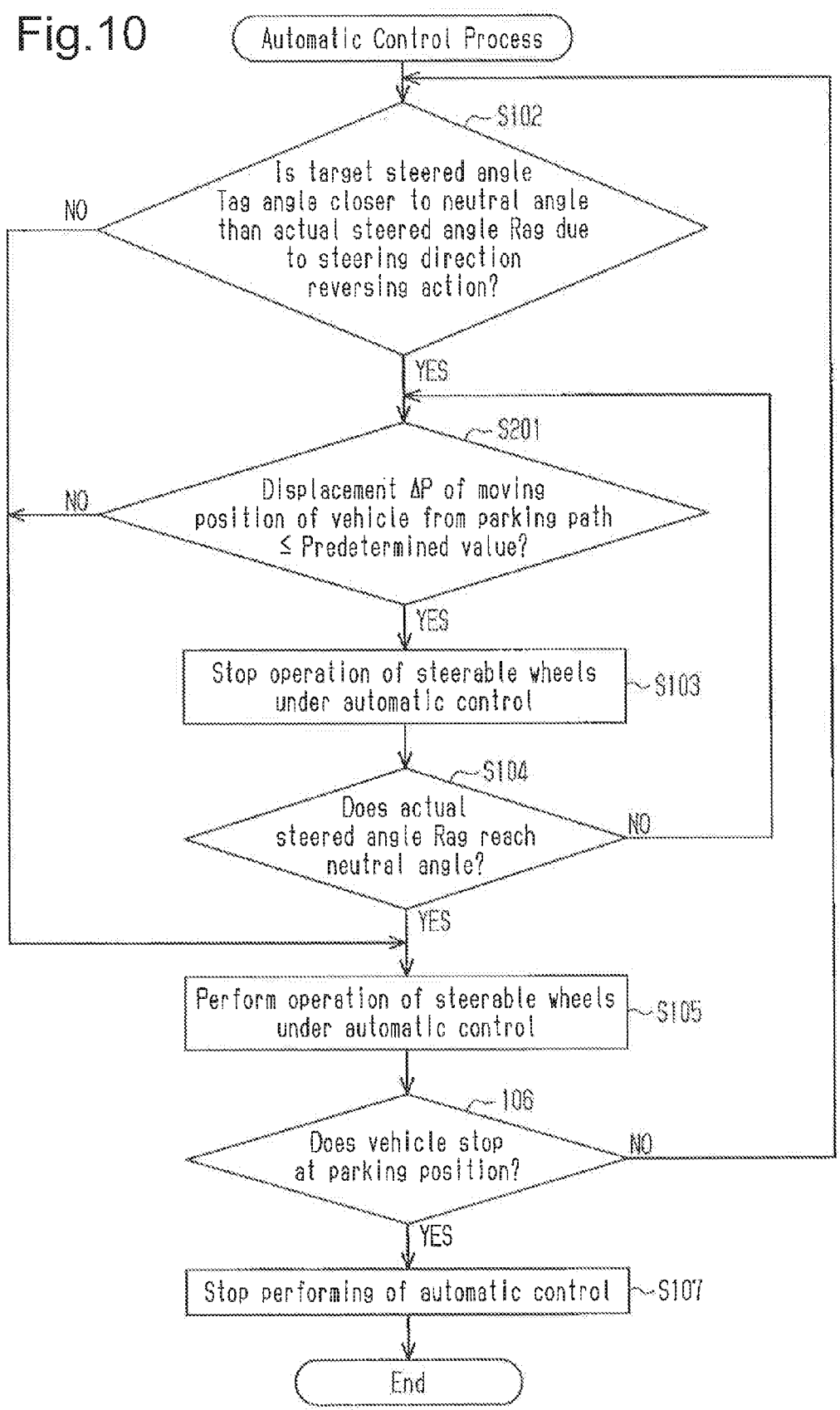
FIG. 10 is a flowchart illustrating a flow of the automatic control process according to the second embodiment.

A series of processes illustrated in the flowchart of FIG. 10 conceptually represents a flow of the automatic control process. The actual processing of the automatic control process is performed as an interrupt process every predetermined cycle by the electronic control unit 30. The automatic control process is performed on condition that calculation of the entry path has been completed in performing the entry assistance of the vehicle 10. In FIG. 10, the same processes as in the automatic control process (FIG. 8) according to the first embodiment are referenced by the same reference signs and detailed description thereof will not be repeated.

As illustrated in FIG. 10, in this process, the operation of the steerable wheels 12 under the automatic control of the steering device 20 is performed (step S105) when the actual steered angle Rag is an angle closer to the neutral angle than the target steered angle Tag or when the target steered angle Tag is changed to an angle closer to the neutral angle than the actual steered angle Rag due to an operation other titan the steering direction reversing action (NO in step S102).

When the target steered angle Tag is an angle closer to the neutral angle than the actual steered angle Rag in the steering direction reversing action of the vehicle 10 (YES in step S102), the operation of the steerable wheels 12 under the automatic control of the steering device 20 is stopped (step S103) on condition that the displacement $\Delta P$ of the moving position of the vehicle 10 from the entry path is equal to or less than the predetermined value (YES in step S201). Accordingly, since the operating state of the motor 21 is a torque-free state, in which a rotational torque is not applied to the output shaft, the motor 21 rotates to change the direction of the steerable wheels 12 by application of the steering reaction force while the vehicle 10 is traveling. The process of step S103 is continuously performed until the actual steered angle Rag reaches the neutral angle (NO in step S104).

When the operation of the steerable wheels 12 under the automatic control of the steering device 20 is not being performed (YES in step S102) and the displacement $\Delta P$ of the moving position of the vehicle 10 from the entry path is greater than the predetermined value (NO in step S201), performing of the operation of the steerable wheels 12 under the automatic control of the steering device 20 is started (step S105). The process of step S105 is continuously performed until the displacement $\Delta P$ is equal to or less than the predetermined value (NO in step S201). As a result, since the displacement $\Delta P$ decreases, a great displacement of the moving position of the vehicle 10 from the entry path is avoided.

In this way, in the automatic control process according to the present embodiment, when the displacement $\Delta P$ is equal to or less than the predetermined value in the period until the actual steered angle Rag reaches the neutral angle in the steering direction reversing action of the vehicle 10, the operation of the steerable wheels 12 under the automatic control of the steering device 20 is stopped and the rise in temperature of the steering device 20 is suppressed.

When the vehicle 10 stops at the parking position (YES in step S106), the automatic control of the steering device 20 is stopped (step S107) and this process flow ends.

In addition, to the advantages (1) and (3) of the first embodiment, the present embodiment achieves the following advantage (4).

(4) Stopping of the operation of the steerable wheels 12 under the automatic control of the steering device 20 is permitted when the displacement ΔP of the moving position of the vehicle 10 from the entry path is equal to or less than the predetermined value, and the stopping of the operation of the steerable wheels 12 under the automatic control of the steering device 20 is prohibited when the displacement ΔP is greater than the predetermined value. Accordingly, it is possible to suppress the rise in temperature of the steering device 20 using the steering reaction force and to suppress the displacement of the moving position of the vehicle 10 from the entry path to cause the vehicle 10 to appropriately enter the parking space P1.

Other Embodiments

The above described embodiments may be modified as follows.

The invention is not limited to the configuration in which the current supplied to the motor 21 is set to 0 when the operation of the steerable wheels 12 under the automatic control of the steering device 20 is stopped, but a slight current may be supplied to the motor 21 when the rotation shaft of the motor 21 rotates to change the direction of the steerable wheels 12 try the steering reaction force.

The driving assistance devices according to the above-mentioned embodiments are not limited to a device provided with the steering wheel 11 as a steering operator for changing the direction of the steerable wheels 12 by a driver's operation, but can be applied to a device provided with an operation lever or a section provided with an operation switch.

In a state in which the operation of the steerable wheels 12 under the automatic control of the steering device 20 is not being performed in the entry assistance of the vehicle 10, when it is determined that there is a possibility that the vehicle 10 will come into contact with an obstacle, the stopping of the operation of the steerable wheels 12 under the automatic control may be released and the operation may be started. According to this system, when the moving position of the vehicle 10 is displaced from the entry path and thus there is a possibility that the vehicle 10 will come into contact with an obstacle, the operation of the steerable wheels 12 under the automatic control of the steering device 20 can be started to return the moving position of the vehicle 10 to the entry path and it is thus possible to avoid a contact of the vehicle 10 with the obstacle. The possibility that the vehicle 10 will come into contact with an obstacle may be determined based on the distance between the obstacle and the vehicle 10, which is detected by the clearance sonars 31 and 33 or the ultrasonic sensors 32 and 34 or may be determined based on the relationship among the parking space P1, the peripheral space P2, and the moving position of the vehicle 10.

In the first embodiment, instead of using the temperature of the motor 21 detected by the temperature sensor 40 as the temperature of the steering device 20, for example, the temperature of an arbitrary part of the steering device 20 such as the temperature of the drive circuit 22 may be detected and used as the temperature of the steering device 20.

The process of step S101 in the automatic control process according to the first embodiment (FIG. 6) may be omitted.

The process of step S101 in the automatic control process according to the first embodiment (FIG. 8) and the process of step S201 in the automatic control process according to the second embodiment (FIG. 10) may be both performed. In this system, when the temperature of the steering device 20 is equal to or higher than the threshold temperature J (YES in step S101) and the displacement ΔP of the moving position of the vehicle 10 from the entry path is equal to or less than the predetermined value (YES in step S201), the stopping of the operation of the steerable wheels 12 under the automatic control of the steering device 20 is permitted. In contrast, when the temperature of the steering device 20 is less than the threshold temperature J (NO in step S101) or when the displacement ΔP of the moving position of the vehicle 10 from the entry path is greater than the predetermined value (NO in step S201), the operation of the steerable wheels 12 under the automatic control of the steering device 20 is performed without being stopped.

In the second embodiment, the method of calculating the displacement ΔP of the moving position of the vehicle 10 from the entry path can be arbitrarily replaced with a method of calculating the shortest distance between the moving position of the vehicle 10 and the entry path as the displacement or the like. In short, any configuration may be employed as long as a value can be calculated that can be used to determine whether the moving position of the vehicle 10 is displaced from the entry path.

When the target steered angle Tag is changed to an angle closer to the neutral angle than the actual steered angle Rag while the vehicle 10 is traveling in performing the automatic control process as well as when the target steered angle Tag is changed to an angle closer to the neutral angle than the actual steered angle Rag due to the steering direction reversing action of the vehicle 10, the operation of the steerable wheels 12 under the automatic control of the steering device 20 may be stopped. Also in this system, it is possible to operate the steerable wheels 12 under the automatic control using the steering reaction and thus to suppress the rise in temperature of the steering device 20.

The process for stopping the operation of the steerable wheels 12 under the automatic control of the steering device 20 when the target steered angle Tag is an angle closer to the neutral angle than the actual steered angle Rag may also be performed in performing exit assistance of assisting exit of the vehicle 10 from the parking space P1 as well as in performing the entry assistance of assisting the entry of the vehicle 10 into the parking space P1. A specific example of the exit assistance will be described below. The exit assistance is started when a request for performing the exit assistance is given by the driver's operation on the display panel 13 or the like.

Figure 11:
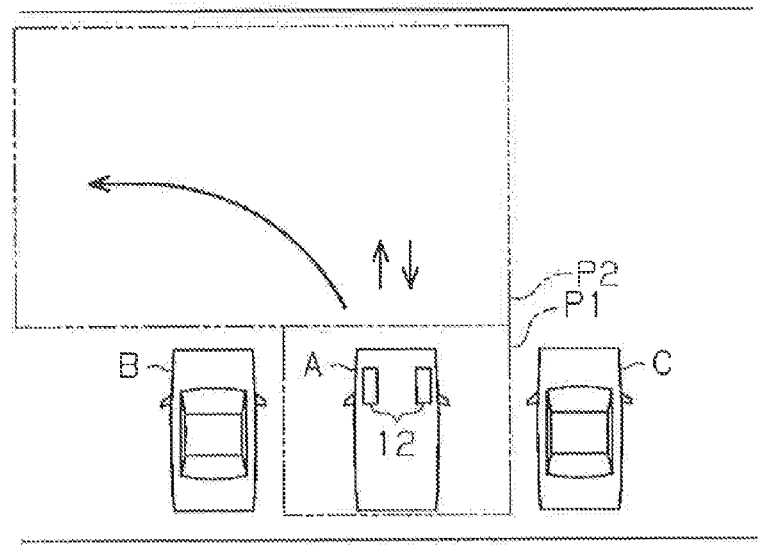
FIG. 11 is a schematic diagram illustrating an example of an operation of steerable wheels in performing exit assistance in the perpendicular parking mode.

When the exit assistance in the perpendicular parking mode is started, the electronic control unit 30 instructs the driver to perform a measurement starting operation as preparation, for measuring the size of the parking space P1. Specifically, in a state in which the vehicle A is in the parking space P1 as indicated by solid lines in FIG. 11, the electronic control unit 30 instructs the driver to release the brake pedal 17 in a state in which the shift lever 15 is in the drive position. The electronic control unit 30 performs a measuring process for measuring the size of the parking space P1 on condition that the driver has performed the above-mentioned measurement starting process. In the measuring process, the vehicle A reciprocates forward and backward so as not to come into contact with an obstacle. During this reciprocation, the electronic control unit 30 monitors signals from the clearance sonars 31 and 33 and the ultrasonic sensors 32 and 34 and obtains the size of the parking space P1 or the peripheral space P2 and the relative position of the vehicle A to the parking space P1 based on true signals from the sensors. Thereafter, the electronic control unit 30 calculates a path of the exit (an exit path indicated by the black arrow in FIG. 11) of the vehicle A from the parking apace P1, in which the vehicle A is parked based on the margin of the size of the parking space P1 with respect to the size of the vehicle A, and automatically controls the steering device 20 such that the vehicle A moves to a target position along the path.

Figure 12:
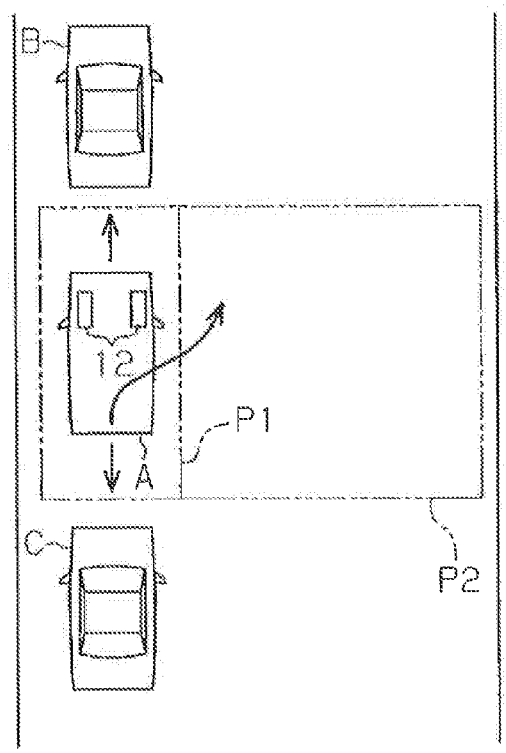
FIG. 12 is a schematic diagram illustrating an example of an operation of steerable wheels in performing the exit assistance in true parallel parking mode.

When the exit assistance in the parallel parking mode is started, the electronic control unit 30 instructs the driver to perform a measurement starting operation as preparation for measuring the size of the parking space through display on the display panel 13 or sound from the speaker 14. Specifically, in a state in which the vehicle A is in the parking space P1 as indicated by a solid line in FIG. 12, the electronic control unit 30 instructs the driver to release the brake pedal 17 in a state in which the shift lever 15 is in the drive position.

The electronic control unit 30 performs a measuring process for measuring the size of the parking space P1 using the clearance sonars 31 and 33 and the ultrasonic sensors 32 and 34 on condition that the driver has performed the above-mentioned measurement starting process. As the measuring process, the electronic control unit 30 causes the vehicle A to reciprocates forward and backward in a range in which the vehicle A does not come into contact with an obstacle such as the vehicle B and the vehicle C while monitoring signals from the clearance sonars 31 and 33 and the ultrasonic sensors 32 and 34. Further, during the reciprocation, the electronic control unit 30 monitors signals from the clearance sonars 31 and 33 and the ultrasonic sensors 32 and 34 and obtains the size of the parking space P1 or the peripheral space P2 and the relative position of the vehicle A to the parking space P1 based on the signals from the sensors. Thereafter, the electronic control unit 30 calculates a path of the exit (an exit path indicated by the black arrow in FIG. 12) of the vehicle A from the parking space P1, in which the vehicle A is parked based on a margin of the size of the parking space P1 with respect to the size of the vehicle A, and automatically controls the steering device 20 such that the vehicle A moves to a target position along the path.

In the automatic control in the exit assistance, the moving position of the vehicle 10 is calculated based on use initial position (the relative position of the vehicle 10 at the time of starting the exit assistance) of the vehicle 10, the vehicle wheel speed SPD, and the actual steered angle Rag, and the target steered angle Tag used to cause the vehicle 10 to move along the exit path is calculated based on the moving position and the exit path. The operation of the steering device 20 is controlled such that the actual steered angle Rag agrees with the target steered angle Tag. When the automatic control of the steering device 20 is performed in the exit assistance, the operation of the steerable wheels 12 under the automatic control of the steering device 20 may be stopped on condition that the target steered angle Tag has become an angle closer to the neutral angle than the actual steered angle Rag.

Whether the target steered angle Tag is an angle closer to the neutral angle than the actual steered angle Rag does not necessarily need to be directly determined based on the relationship among the target steered angle Tag, the actual steered angle Rag, and the neutral angle, but it may be estimated based on the operating state of the vehicle 10. In the above-mentioned embodiment, for example, in the period until the actual steered angle Rag reaches the neutral angle in performing the steering direction reversing action, the target steered angle Tag is an angle closer to the neutral angle than the actual steered angle Rag. Accordingly, by estimating whether the present time is in the above-mentioned period based on the operating state of the vehicle 10, it can be determined whether the target steered angle Tag is an angle closer to the neutral angle than the actual steered angle Rag. Whether the present time is in the above-mentioned period may be determined based on the relationship between the entry path (or the exit path) and the actual moving position of the vehicle 10 or may be determined based on the fact that the actual steered angle Rag continuously varies to the neutral angle for a predetermined time or more.

As the condition for stopping the operation of the steerable wheels 12 under the automatic control of the steering device 20, a condition of "a period until the actual steered angle Rag reaches the neutral angle in performing the steering direction reversing action" may be set instead of the condition in which "the target, steered angle Tag is an angle closer to the neutral angle than the actual steered angle Rag." That is, it may be determined whether the present time is in the period until the actual steered angle Rag reaches the neutral angle in performing the steering direction reversing action, the operation of the steerable wheels 12 under the automatic control of the steering device 20 may be stopped when the determination result is positive, and the operation of the steerable wheels 12 under the automatic control of the steering device 20 may be performed when the determination result is negative. In this system, when the steering reaction force can be used to change the actual steered angle Rag, the operation of the steerable wheels 12 under the automatic control of the steering device 20 can be stopped and it is thus possible to obtain the operational advantages similar to those in the above-mentioned embodiments.

DESCRIPTION OF THE REFERENCE NUMERALS

10 . . . Vehicle,
11 . . . Steering Wheel,
12 . . . Steerable Wheel,
13 . . . Display Panel,
14 . . . Speaker,
15 . . . Shift Lever,
16 . . . Accelerator Pedal,
17 . . . Brake Pedal,
20 . . . Steering device,
21 . . . Motor,
22 . . . Drive Circuit,
30 . . . Electronic control unit,
31, 33 . . . Clearance Sonar,
32, 34 . . . Ultrasonic Sensor,
33 . . . Shift Position Sensor,
36 . . . Accelerator Position Sensor,
37 . . . Brake Switch,
38 . . . Vehicle Wheel Speed Sensor,
39 . . . Angle Sensor,
40 . . . Temperature Sensor

The invention claimed is:

1. A parking assistance device that assists an operation of steerable wheels for causing a vehicle to enter or exit a parking space by automatic control of a steering device, the parking assistance device comprising:
    a path calculating section configured to calculate a moving path along which the vehicle moves to a target position;
    a steered angle calculating section configured to calculate a target steered angle of the steerable wheels required for causing the vehicle to move along the moving path;
    a steered angle detecting section configured to detect an actual steered angle of the steerable wheels; and
    a control section configured to stop the operation of the steerable wheels under the automatic control when the target steered angle is an angle closer to a neutral angle than the actual steered angle and to perform the operation of the steerable wheels under the automatic control when the target steered angle is not an angle closer to the neutral angle than the actual steered angle.

2. The parking assistance device according to claim 1, wherein the control section is configured to permit stopping of the operation of the steerable wheels under the automatic control when a displacement of a moving position of the vehicle from the moving path is equal to or less than a predetermined value and to prohibit stopping of the operation of the steerable wheels under the automatic control when the displacement is greater than the predetermined value.

3. The parking assistance device according to claim 1, wherein the control section is configured to permit stopping of the operation of the steerable wheels under the automatic control when a temperature of the steering device is equal to or higher than a threshold temperature and to prohibit stopping of the operation of the steerable wheels under the automatic control when the temperature of the steering device is lower than the threshold temperature.

4. The parking assistance device according to claim 1, wherein the control section is configured to stop the operation of the steerable wheels under the automatic control until the actual steered angle reaches the neutral angle when the target steered angle varies to pass the neutral angle.

5. A parking assistance device that assists an operation of steerable wheels for causing a vehicle to enter or exit a parking space by automatic control of a steering device, the parking assistance device comprising:
    an angle sensor configured to detect an actual steered angle of the steerable wheels; and
    an electronic control unit, wherein the electronic control unit is configured to
    calculate a moving path along which the vehicle moves to a target position,
    calculate a target steered angle of the steerable wheels required for causing the vehicle to move along the moving path,
    stop the operation of the steerable wheels under the automatic control when the target steered angle is an angle closer to a neutral angle than the actual steered angle, and
    perform the operation of the steerable wheels under the automatic control when the target steered angle is not an angle closer to the neutral angle than the actual steered angle.

* * * * *